US012023790B2

(12) United States Patent
Fukuda et al.

(10) Patent No.: US 12,023,790 B2
(45) Date of Patent: Jul. 2, 2024

(54) DRIVING TOOL

(71) Applicant: MAKITA CORPORATION, Anjo (JP)

(72) Inventors: Kazusa Fukuda, Anjo (JP); Masaya Nagao, Anjo (JP); Kiyonobu Yoshikane, Anjo (JP); Toshiro Hirayama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/951,412

(22) Filed: Sep. 23, 2022

(65) Prior Publication Data

US 2023/0129001 A1 Apr. 27, 2023

(30) Foreign Application Priority Data

Oct. 26, 2021 (JP) ................................. 2021-174445

(51) Int. Cl.
*B25C 1/04* (2006.01)

(52) U.S. Cl.
CPC .............. *B25C 1/041* (2013.01); *B25C 1/047* (2013.01)

(58) Field of Classification Search
CPC ................................................ B25C 1/04–048
USPC .......................................................... 227/130
See application file for complete search history.

(56) References Cited

U.S. PATENT DOCUMENTS

| | | | | |
|---|---|---|---|---|
| 6,783,049 | B2 * | 8/2004 | Rosenbaum | B25C 1/08 123/46 R |
| 10,843,317 | B2 * | 11/2020 | Sato | B25C 1/047 |
| 10,843,318 | B2 | 11/2020 | Kobori et al. | |
| 11,247,320 | B2 * | 2/2022 | Li | B25C 1/06 |
| 11,331,780 | B2 * | 5/2022 | Zhao | B25C 1/04 |
| 11,667,020 | B2 * | 6/2023 | Kuriki | B25C 1/06 227/8 |
| 2018/0126530 | A1 * | 5/2018 | Pomeroy | B25C 1/047 |
| 2018/0290279 | A1 | 10/2018 | Kobori et al. | |
| 2020/0189080 | A1 * | 6/2020 | Aizawa | B25C 1/06 |
| 2020/0282534 | A1 * | 9/2020 | Po | B25C 1/06 |
| 2020/0331132 | A1 * | 10/2020 | Po | B25C 1/047 |
| 2021/0031348 | A1 | 2/2021 | Kobori et al. | |
| 2021/0146517 | A1 * | 5/2021 | Shioya | B25C 1/04 |
| 2021/0197350 | A1 * | 7/2021 | Umino | B25C 1/06 |
| 2022/0009067 | A1 * | 1/2022 | Knight | B25C 1/06 |

FOREIGN PATENT DOCUMENTS

| | | | | |
|---|---|---|---|---|
| DE | 102018117519 A1 | * | 1/2020 | B25C 1/041 |
| JP | 2011025363 A | * | 2/2011 | B25C 1/04 |

* cited by examiner

*Primary Examiner* — Joshua G Kotis
(74) *Attorney, Agent, or Firm* — Oliff PLC

(57) ABSTRACT

A driving tool comprises a cylinder extending in an up-down direction and a piston that moves downward within the cylinder due to a compressed gas to drive a driving member. The driving tool further comprises a main body housing that houses the cylinder and a grip extending rearward from a rear surface of the main body housing. The driving tool further comprises an upper chamber that is provided above the cylinder and communicates with the cylinder. The driving tool further comprises an air chamber that extends downward from the upper chamber and that extends only in an area on a right or left side of the main body housing with respect to both an axis center of the cylinder and an axis center of the grip.

16 Claims, 11 Drawing Sheets

DRIVING TOOL

CROSS-REFERENCE TO RELATED APPLICATIONS

This application claims priority to Japanese patent application serial number 2021-174445, filed on Oct. 26, 2021, the contents of which are incorporated herein by reference in their entirety for all purposes.

BACKGROUND

The present disclosure generally relates to a driving tool for driving a driving member, such as a nail or a staple, into a wooden material, etc.

Driving tools, such as a gas-spring type driving tool, have been widely used. Gas-spring type driving tools may utilize, for example, a pressure of a compressed gas as a thrust power for driving a driving member. A gas-spring type driving tool may include a piston that moves in an up-down direction within a cylinder and may also include a driver that is integrally connected to the piston. The piston and the driver may move downward in a driving direction due to a pressure of the gas filled in an accumulation chamber. The driver may drive a driving member located below the driver, and the driving member may be ejected from the driving tool and driven into a workpiece. The piston and the driver may return in a direction opposite to the driving direction by a lift mechanism after the driving member has been ejected from the driving tool.

SUMMARY

According to one feature of the present disclosure, a driving tool comprises a cylinder extending in an up-down direction and a piston that moves downward within the cylinder due to a compressed gas to drive a driving member. The driving tool further comprises a housing that houses the cylinder and comprises a grip extending rearward from a rear surface of the housing. The driving tool further comprises an upper chamber that is provided above the cylinder and that communicates with the cylinder. The driving tool further comprises an air chamber that extends downward from the upper chamber and that also extends only in an area on either one of the left side or the right side of the housing in a left-right direction with respect to both a center axis of the cylinder and a center axis of the grip.

Since the air chamber extends downward from the upper chamber, an upper area of the driving tool is restricted from being enlarged. Furthermore, by arranging the air chamber on either one of left side or the right side with respect to both the center axis of the cylinder and the center axis of the grip, a distance between the center axis of the cylinder and a front end of the grip in the front-rear direction can be made small. When a user operates the driving tool, the user may hold a vicinity of a front end of the grip to hold the driving tool. Because of this, when the driving member is driven, the driving tool receives a reaction force from the workpiece. Due to the reaction force, a rotational moment that rotates the driving tool around the vicinity of the front end of the grip is generated. The arrangement of the air chamber described above can reduce this rotational moment. Furthermore, the arrangement of the air chamber described above can also restrict the front area of the driving tool from being enlarged. Because of this configuration, the air chamber can be arranged to be compact around a portion of the cylinder. Furthermore, the rotational moment in the driving tool that occurs when the driving operation is performed can be reduced, thereby improving operability of continuous operation of the driving tool.

DETAILED DESCRIPTION

Figure 1:
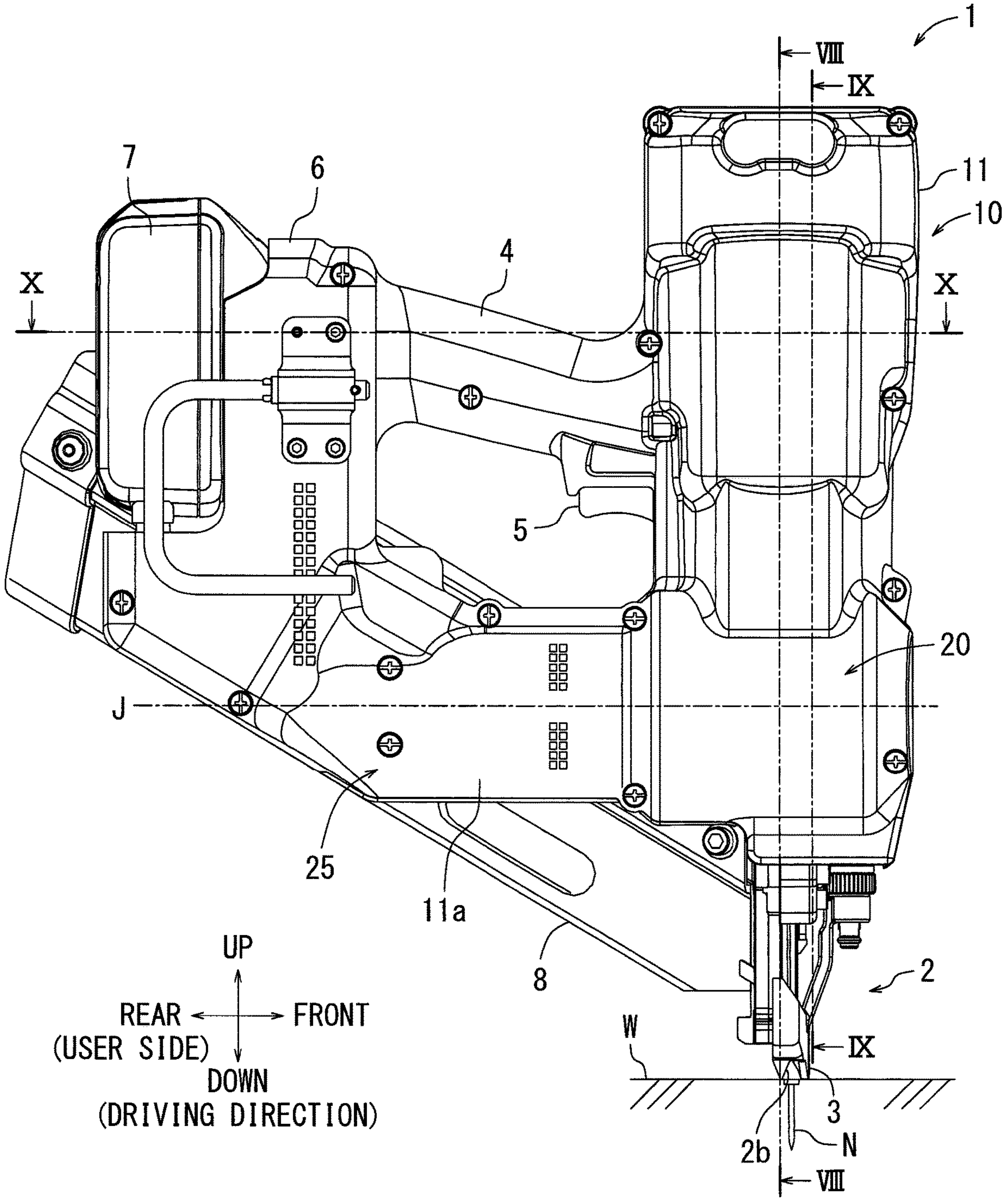
FIG. 1 is a right side view of a driving tool.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

A pressure of the gas filled in the accumulation chamber may increase as the piston moves upward in the direction opposite to the driving direction. If a capacity of the accumulation chamber is small, a pressure difference between when a driving operation starts and when the driving member is ejected from the driving tool may be large. By enlarging the capacity of the accumulation chamber, the pressure difference may be reduced, thereby allowing the driving member to be more strongly driven. However, enlargement of the capacity of the accumulation chamber may prevent the driving tool from being compact. Thus, there is a need for an accumulation chamber having a high capacity as well as a compact size. For example, a gas-spring type driving tool may have an accumulation chamber which includes an upper chamber disposed above a piston and an air chamber extending downward from the upper chamber along an outer periphery of a cylinder.

Generally speaking, when a user uses a driving tool, the user may hold a grip of the driving tool in the vicinity in which a trigger is arranged. The grip may extend rearward from a lateral portion of a tool main body that houses the cylinder, in a direction intersecting with an axial direction of the cylinder. The trigger may be disposed at a front portion of the grip. When the driving member is driven, the driving tool may receive a reaction force from a workpiece toward an ejecting port from which the driving member is being ejected. The reaction force may be applied to the driving tool upward along a center axis of the cylinder. Due to the reaction force, a rotational moment (torque) that rotates the driving tool around a user's holding portion, which is likely adjacent to the trigger, may be generated. Each time a driving member is driven, a rotational moment may be generated. This will make the user tired as they try to maintain a driving posture of the driving tool. As a result, operability of continuous operations may be impaired. Accordingly, there may be room to reduce the rotational moment that causes the driving tool to rotate, which is generated by the reaction force from the workpiece.

Typically, the downwardly extending air chamber disclosed extends behind the cylinder and in front of the trigger. Because of this configuration, a distance between a center axis of the cylinder and a holding portion of a tool main body adjacent to the trigger may be large. This will make it more difficult to reduce a rotational moment that occurs when a driving operation is performed. A possible approach is to reduce the rotational moment by, for example, arranging the downwardly extending air chamber in front of the cylinder, which is on a side of the cylinder opposite the trigger. However, with this arrangement, a front area of the tool main body may be large, which may make it difficult to drive a driving member into, for example, an end edge of a workpiece adjacent to a wall.

As described above, there may be room to improve a configuration and an arrangement of an air chamber in a gas-spring type driving tool. Thus, there is a need for a driving tool that has a compact air chamber and improved operability of continuous operations.

According to a feature of the present disclosure, the air chamber continuously includes a front area positioned on the front side of the cylinder, a lateral area positioned on either the left side or the right side of the cylinder, and a rear area positioned on the rear side of the cylinder. A left-right width of the lateral area is configured to be larger than both a front-rear width of the front area and a front-rear width of the rear area. Because of this configuration, a protruding amount of the housing that houses the cylinder and the air chamber that protrudes in the front-rear direction can be reduced. As a result, a rotation movement of the driving tool in the front-rear direction due to a reaction force generated when a driving operation is performed can be reduced.

According to another feature of the present disclosure, the front-rear width in the rear area is configured to be smaller than the front-rear width in the front area. Accordingly, a distance between the center axis of the cylinder and a front end of the grip can be made small. Because of this configuration, a rotation movement of the driving tool around the front end of the grip due to a reaction force generated when a driving operation is performed can be effectively reduced.

According to another feature of the present disclosure, the driving tool includes a driver that is provided below the piston and that is configured to drive a driving member. The driving tool also includes a magazine for supplying the driving member to the driving passage. The magazine is linked to the housing in an area of the housing opposite to the air chamber, the air chamber being arranged on the either the left or right side of the housing. By arranging the air chamber and the magazine in opposite sides of the housing in the left-right direction, the driving tool can have a good weight balance in the left-right direction. As a result, usability of the driving tool can be improved.

According to another feature of the present disclosure, the driving tool includes a lift mechanism that moves the driver, which drives the driving member in the driving direction, in a direction opposite to the driving direction. The lift mechanism is provided on either the left or right side of the housing. The lift mechanism may be on the side on which the air chamber is provided. In order to make the driving tool compact in the up-down direction, the lift mechanism could be arranged on either one of the left or right sides. This avoids the lift mechanism from protruding in the up-down direction. In particular, by arranging the lift mechanism and the air chamber on the same side, the housing can also be made compact in the left-right direction.

According to another feature of the present disclosure, the air chamber is arranged so as to not be intersected by a front-rear plane that includes both the center axis of the cylinder and the center axis of the grip. Because of this configuration, a front-rear width of the main body housing that houses the cylinder and the air chamber may be made compact.

According to another feature of the present disclosure, a trigger for operating the driving tool is provided at a front end of the grip positioned adjacent to the housing. The air chamber is provided so as to not be positioned directly between the trigger and the cylinder. Accordingly, a distance between the center axis of the cylinder and the trigger can be reduced. Since the driving tool is held by a user in the vicinity of the trigger, a rotation movement of the driving tool around the trigger due to a reaction force generated when a driving operation is performed can be reduced.

According to another feature of the present disclosure, the driving tool includes a top cap that is provided at an upper portion of the housing and that houses the upper chamber. The driving tool further includes a filling valve through which a compressed gas is supplied to the upper chamber. The filling valve is arranged to penetrate a lateral surface of the top cap through a side of the top cap corresponding to either the left or right sides of the housing, the side on which the air chamber is arranged. Accordingly, the top cap is formed to extend more in the direction that the air chamber extends in the left-right direction. In other words, the filling valve can be arranged by utilizing a space in which the top cap is arranged to extend in either the left or right direction. Because of this configuration, the housing that houses the top cap and the air chamber can be made compact in the left-right direction. Furthermore, by arranging the filling valve through a lateral surface on either the left or right side of the top cap, the top cap can be arranged so as to make the top cap compact in the front-rear direction.

Next, one embodiment according to the present disclosure will be described with reference to FIGS. 1 to 11. FIG. 1 shows an example of a driving tool 1, e.g., a gas-spring type driving tool 1 that utilizes a pressure of a gas filled in a chamber above a cylinder 12 as a thrust power for driving a driving member N. In the following explanation, a driving direction of the driving member N is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. Also, a left and right side may be based on a user's position.

Figure 2:
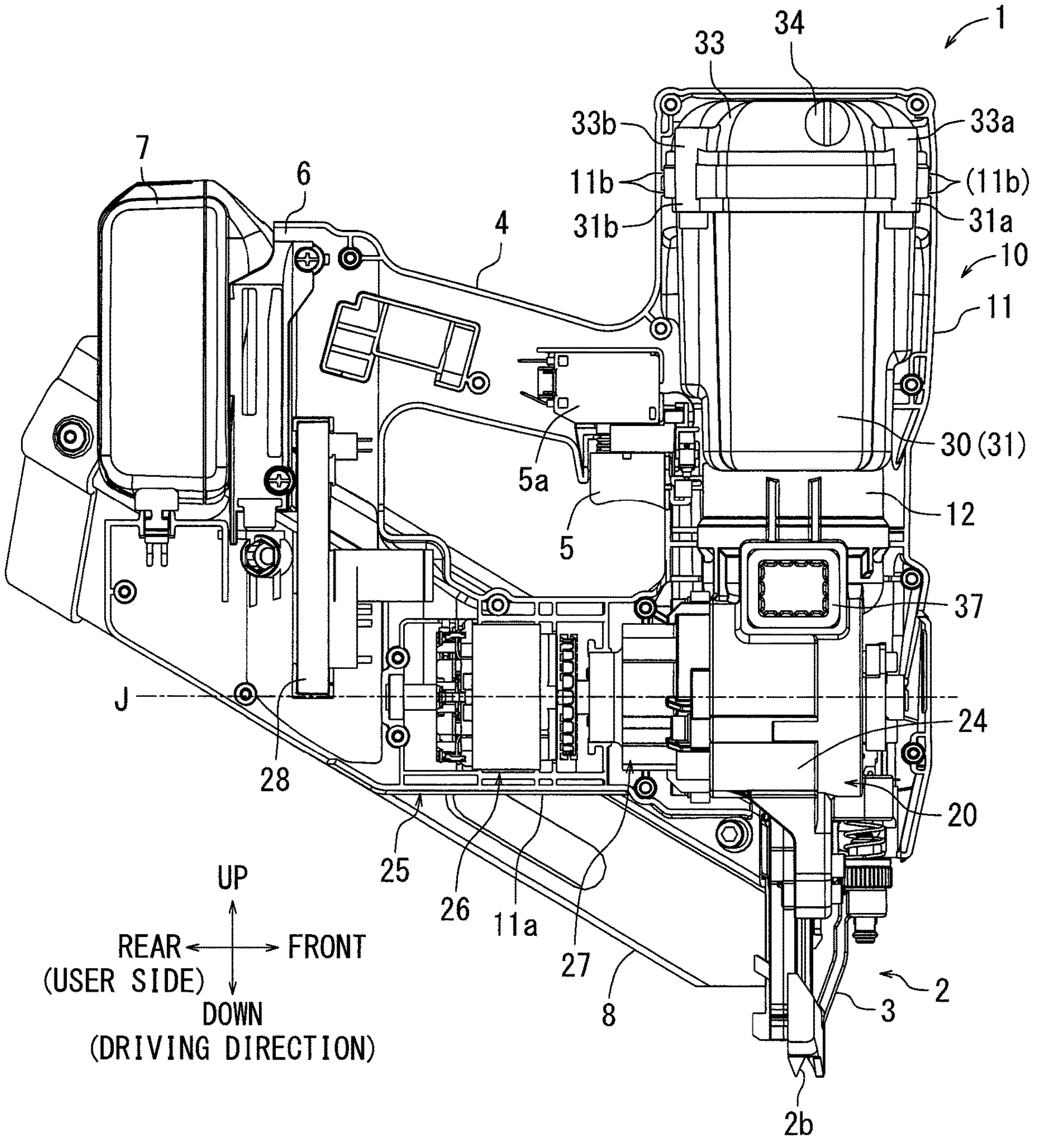
FIG. 2 is a right side view of the driving tool with a right side housing having been removed.
Figure 3:
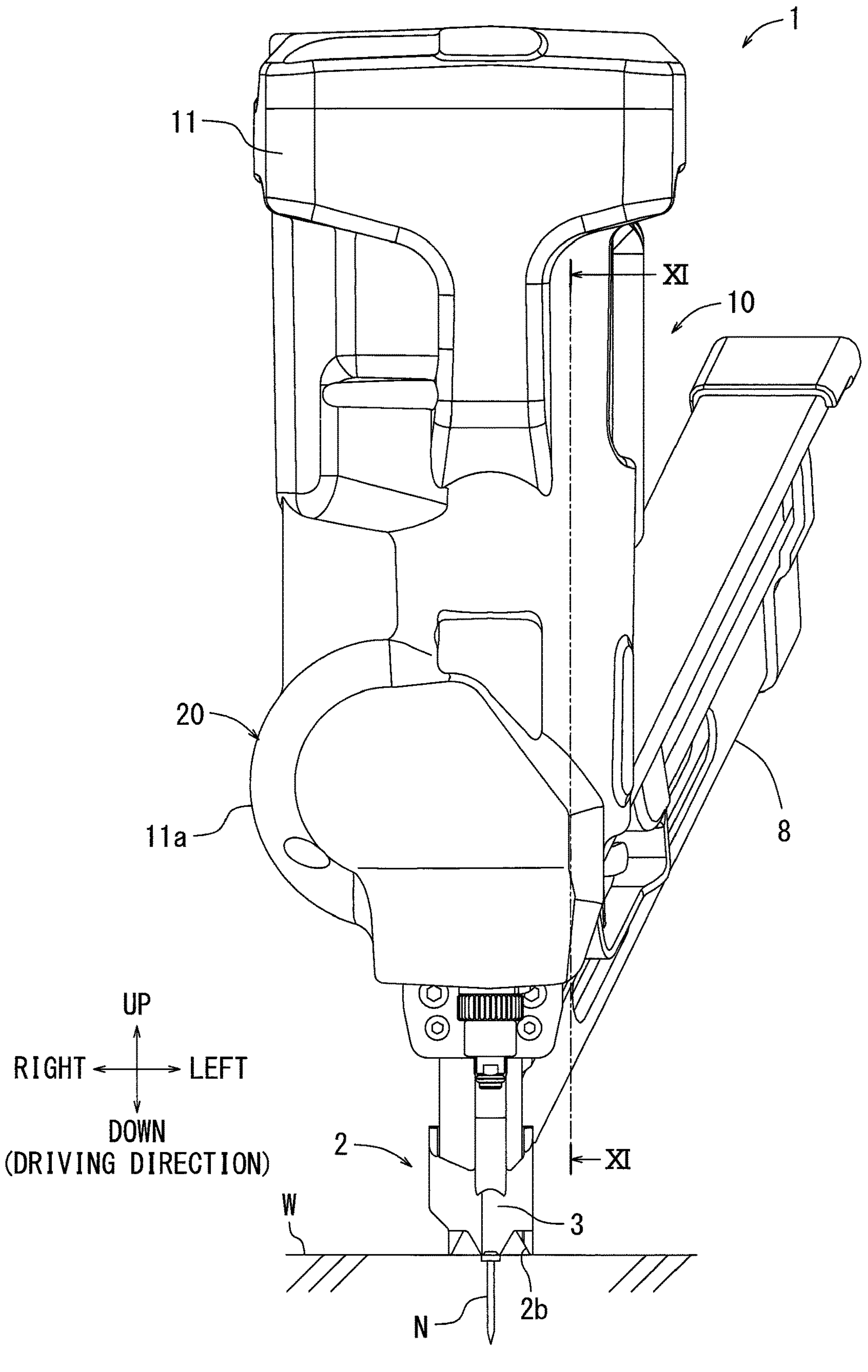
FIG. 3 is a front view of the driving tool.
Figure 6:
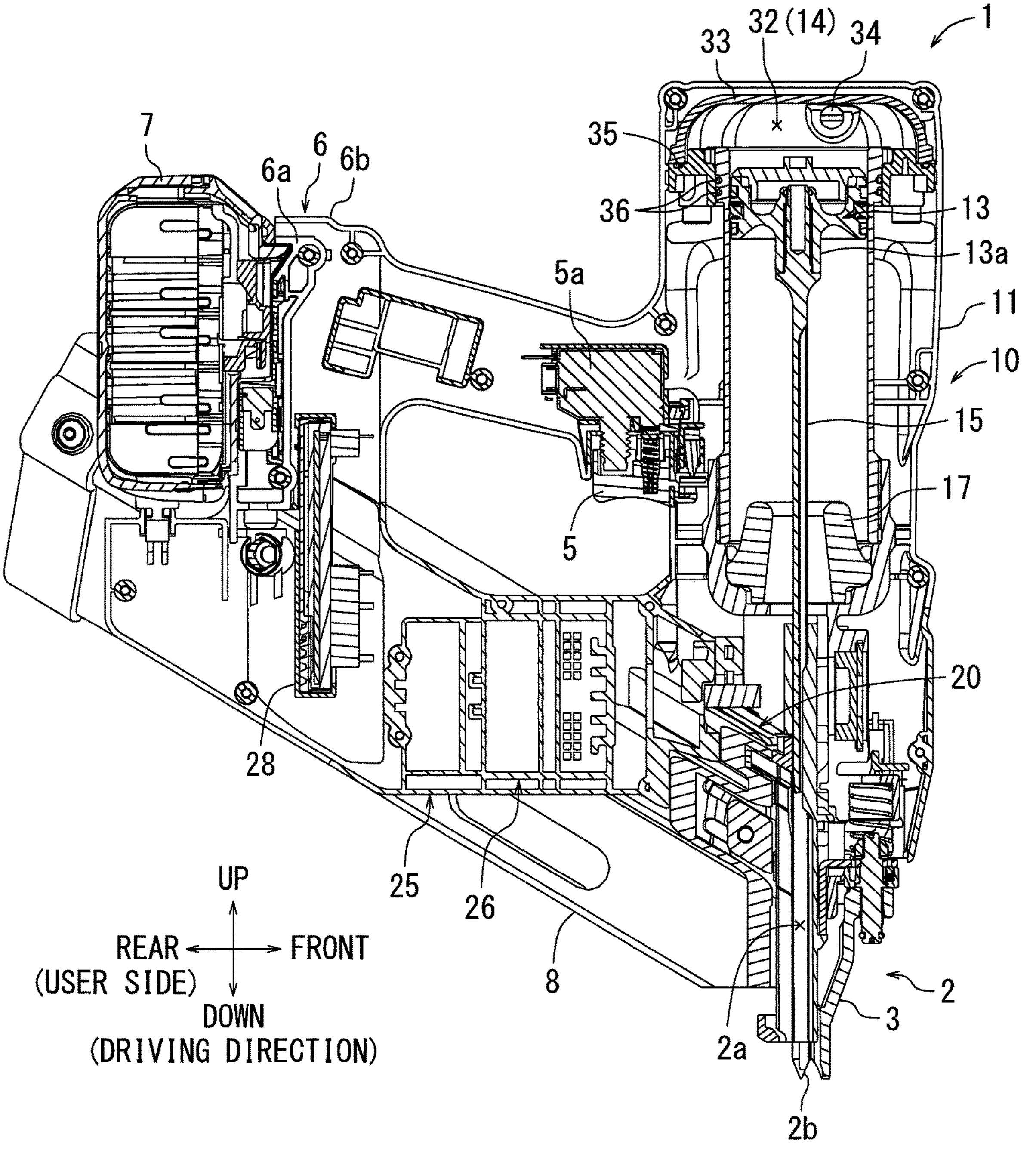
FIG. 6 is a cross-sectional view taken along line VI-VI of FIG. 5.

As shown in FIGS. 1, 2, and 6, the driving tool 1 may include a tool main body 10. The tool main body 10 may be configured to include a cylinder 12 that is housed in a tubular main body housing 11. A piston 13 may be housed within the cylinder 12, so as to be reciprocatable in an up-down direction. An upper portion of the cylinder 12 above the piston 13 may communicate with an accumulation chamber 14. A compressed gas, for example, compressed air, etc., may be filled in the accumulation chamber 14. A pressure of a gas filled in the accumulation chamber 14 may act on an upper surface of the piston 13, thereby providing a thrust power for a downward driving operation.

As shown in FIG. 6, a lower portion of the cylinder 12 may communicate with a driving passage 2*a* of a driving nose 2 located at a lower portion of the tool main body 10. The driving nose 2 may be combined with a magazine 8 in which a plurality of driving member N (refer to FIG. 1) is loaded. Vertically-arranged driving members N may be supplied one by one from the magazine 8 to the driving passage 2*a*. The magazine 8 may extend upward toward a rear portion of the tool main body 10 and in a direction toward a left side of the tool main body 10.

As shown in FIG. 6, a driver 15 may be connected to a lower surface of the piston 13. The driver 15 may be long and extend in an up-down direction. A lower portion of the driver 15 may enter the driving passage 2*a*. Due to the pressure of the gas filled in the accumulation chamber 14, which is configured to act on the upper surface of the piston 13, the driver 15 may move downward within the driving passage 2*a*. A lower end of the driver 15 may drive one driving member N that was supplied to the driving passage 2*a*. The driving member N that is driven by the driver 15 may be ejected from an ejecting port 2*b* of the driving nose 2. The driving member N that is ejected from the ejecting port 2*b* may be driven into the workpiece W. A lower end damper 17 for absorbing an impact of the piston 13 may be disposed on a lower side of the cylinder 12.

Figure 7:
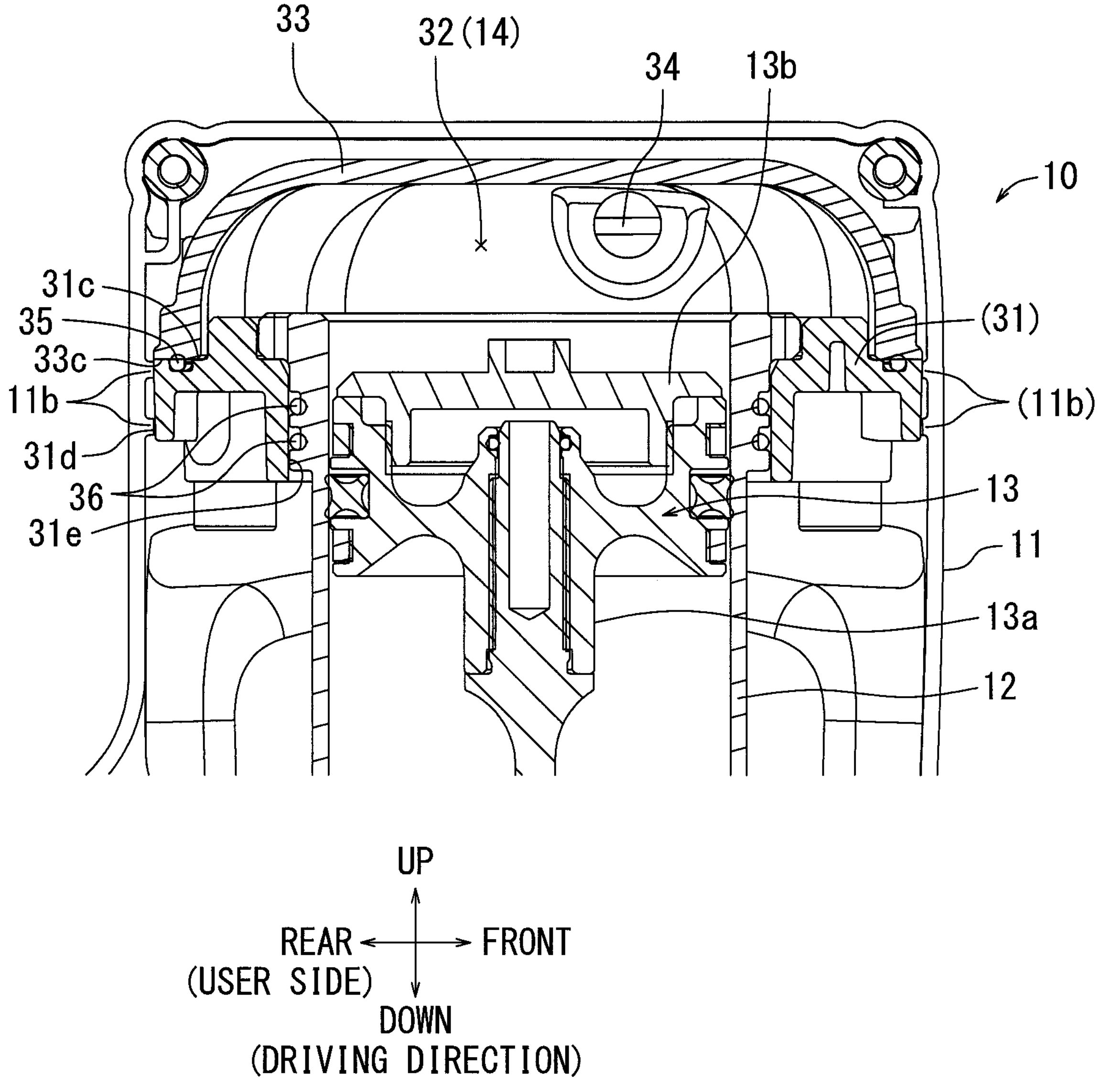
FIG. 7 is an enlarged view of an upper part of a tool main body of FIG. 6.

As shown in FIGS. 6 and 7, the piston 13 may include a piston main body 13*a* that is connected to the driver 15 and a cover 13*b* that is connected to an upper portion of the piston main body 13*a*. As clearly shown in FIG. 7, a hollow area covered by the piston main body 13*a* and the cover 13*b* may be formed above the piston 13. Because of this configuration, the piston 13 may be made light in weight.

Figure 8:
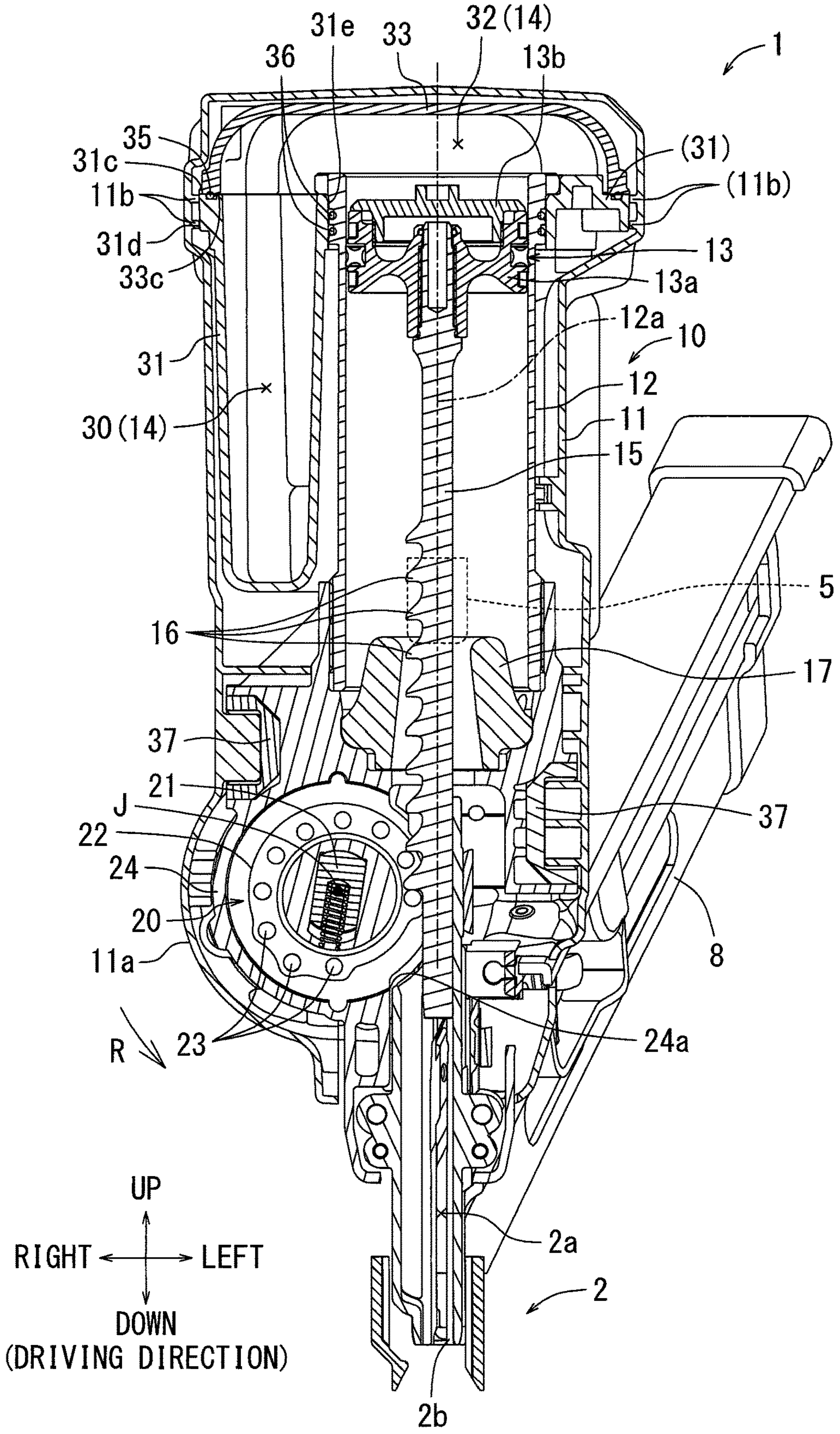
FIG. 8 is a cross-sectional view taken along line VIII-VIII of FIG. 1.

As shown in FIG. 8, a plurality of engaged portions 16 may be formed on a right side of the driver 15. The plurality of engaged portions 16 may be arranged at specified intervals in a longitudinal direction of the driver 15 (in an up-down direction). The plurality of engaged portions 16 may be formed in a rack teeth shape extending in a right direction. Each of the engaged portions 16 may engage a corresponding engaging portion 23 of a lift mechanism 20. The lift mechanism 20 will be discussed later.

As shown in FIGS. 1 and 2, a grip 4 for a user to hold may be formed on a rear side of the tool main body 10. A trigger 5 for the user to perform a pull operation may be arranged at a front lower surface of the grip 4. An activation switch 5*a* may be housed in an interior of the grip 4 above the trigger 5. When the user does not pull the trigger 5, the activation switch 5*a* may be in an off-state. When the user pulls the trigger 5 and when a micro-switch 38 (refer to FIG. 11), discussed later, is in an on-state, the activation switch 5*a* may enter an on-state.

Figure 10:
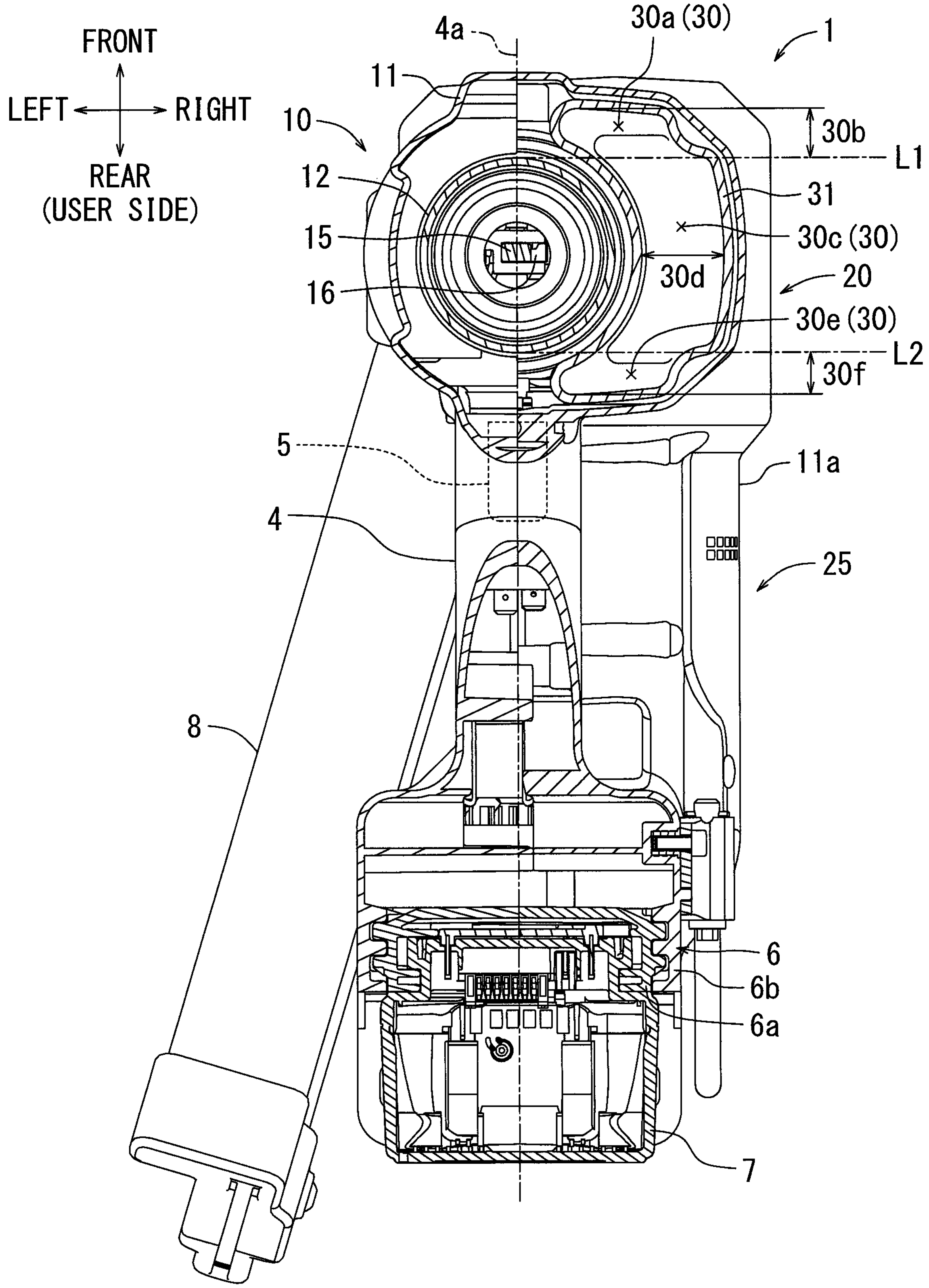
FIG. 10 is a cross-sectional view taken along line X-X of FIG. 1.

As shown in FIGS. 1, 6, and 10, a battery attachment portion 6 may be formed on a rear side of the grip 4. A battery pack 7 may be detachably attached to a rear surface of the battery attachment portion 6 by inserting the battery pack 7 thereto in an up-down direction. The battery attachment portion 6 may include a battery holder 6*a* and a holder case 6*b*. The battery holder 6*a* may be configured to support the battery pack 7. The holder case 6*b* may be configured to support the battery holder 6*a* and be integrally formed with the grip 4. The battery holder 6*a* may be elastically supported by the holder case 6*b* such that the battery pack 7 can be slidable in an attachment/detachment direction (up-down direction). Because of this configuration, for example, when the driving tool 1 happens to fall to cause the tool main body 10 to receive an impact from outside, an impact force transmitted to the battery pack 7 may be reduced by an elastic supporting configuration.

The battery pack 7 shown in FIGS. 1 and 2 may be removed from the battery attachment portion 6 to be repeatedly recharged by a dedicated charger. The battery pack 7 may be used as a power source for various electric power tools. The battery pack 7 may serve as a power source for an electric motor 26 of a driving unit 25 when the activation switch 5*a* is in an on-state. The driving unit 25 will be discussed in detail later.

Figure 5:
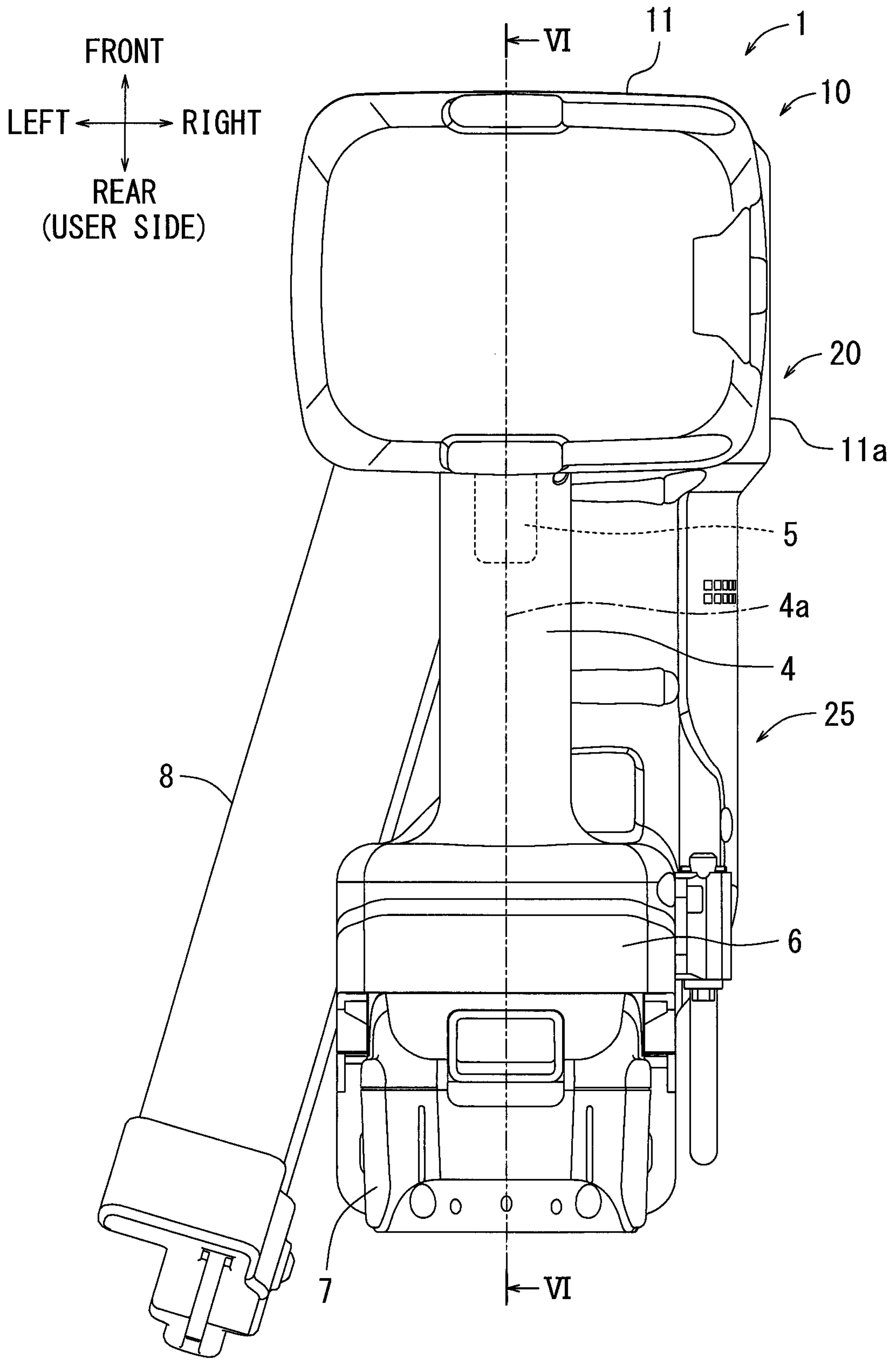
FIG. 5 is a plan view of the driving tool.

As shown in FIG. 5, a center of the trigger 5 may be configured to be positioned on a center axis 4*a* of the grip 4 in a left-right direction. Furthermore, a center of the battery pack 7 attached to the battery attachment portion 6 may be configured to be positioned approximately on the center axis 4*a* of the grip 4 in the left-right direction.

As shown in FIG. 2, a controller 28 may be disposed adjacent to the battery attachment portion 6. The controller 28 may be formed such that a control circuit board is housed in a shallow box-shaped rectangular case. The controller 28 may be arranged such that a width direction of the case is directed to a font-rear direction. The controller 28 may be electrically connected to the battery pack 7, the activation switch 5*a*, the electric motor 26 in the driving unit 25, the micro-switch 38, etc.

Figure 4:
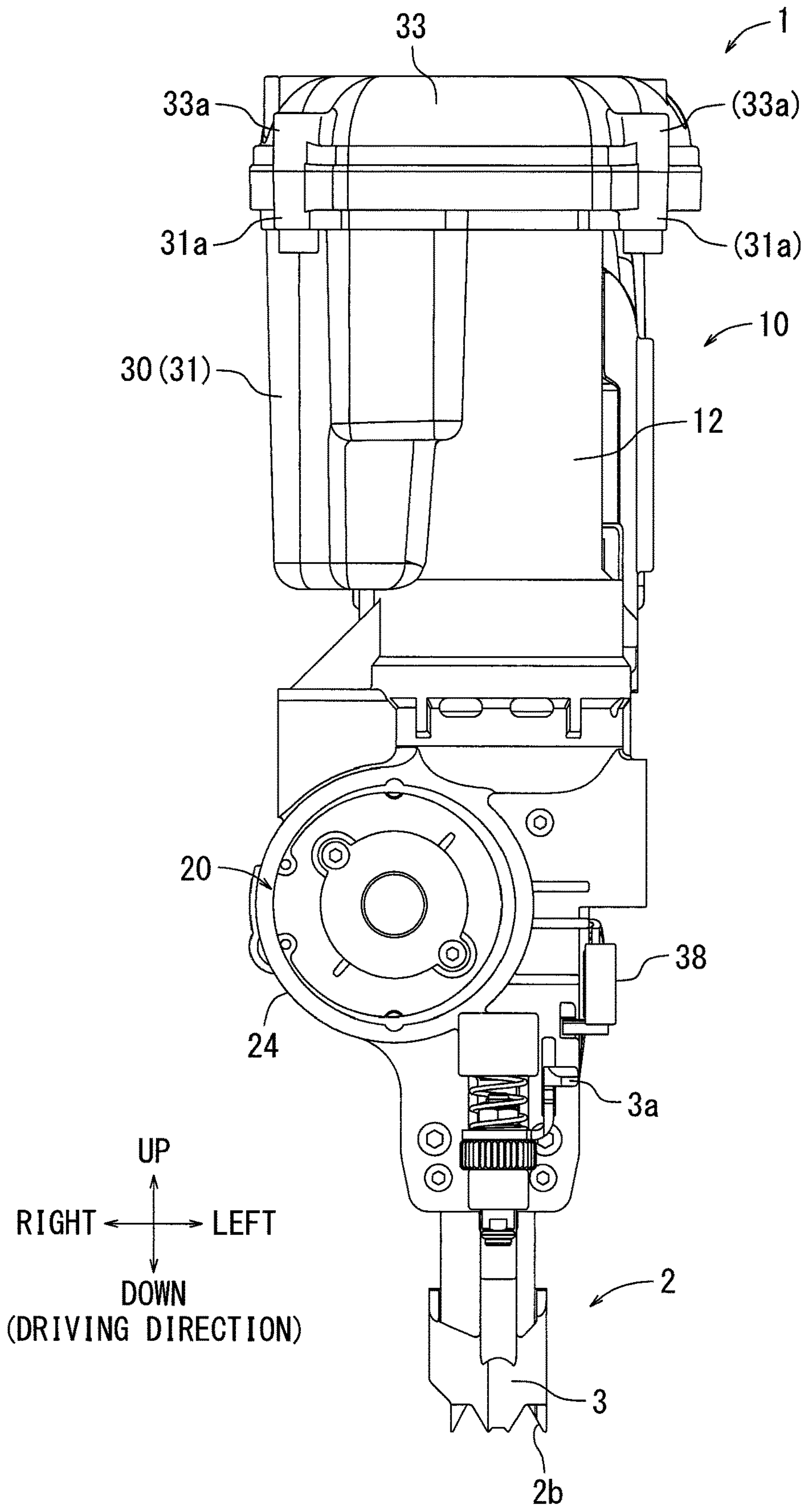
FIG. 4 is a front view of the driving tool with a housing having been removed.

As shown in FIGS. 4 and 8, the lift mechanism 20 may be arranged on a right side of a driving nose 2. The lift mechanism 20 may have a function of moving (returning) the piston 13 together with the driver 15 in an upward direction after a driving operation has been completed. An upward return movement of the piston 15 by the lift mechanism 20 may increase a pressure of the gas in the accumulation chamber 14.

As shown in FIGS. 1 and 2, the driving unit 25 that operates the lift mechanism 20 may be arranged on a rear side of the lift mechanism 20. The lift mechanism 20 and the driving unit 25 may be housed in a driving unit case 11*a* that is formed in approximately a tubular shape. The driving unit case 11*a* may link a lower portion of the main body housing 11 to a lower portion of the battery attachment portion 6. The driving unit case 11*a* may be integrally formed with the main body housing 11.

As shown in FIG. 2, the driving unit 25 may include an electric motor 26 serving as a driving source. The electric motor 26 may be housed in the driving unit case 11*a* such that an axis line of the output shaft of the electric motor 26 (motor axis line J) extends in a front-rear direction perpendicular to the driving direction. The driving unit 25 may include a reduction gear train 27 that is disposed in front of the electric motor 26 and behind the lift mechanism 20. A rotation output of the electric motor 26 may be reduced by the reduction gear train 27 and then output to the forward lift mechanism 20.

As shown in FIG. 8, the lift mechanism 20 may include a rotation shaft 21 and a wheel 22. The rotation shaft 21 may have a rotation axis that is coaxial with the motor axis line J and that extends in the front-rear direction. The wheel 22 may be supported by the rotation shaft 21 so as to rotate together with the rotation shaft 21. The lift mechanism 20 may be housed in approximately a tubular mechanism case 24 that is housed in the driving unit case 11*a*. The rotation shaft 21 may be connected to a last gear of the reduction gear train 27 (refer to FIG. 2). When the electric motor 26 is activated, the rotation shaft 21 and the wheel 22 of the lift mechanism 20 may integrally rotate in a direction indicated by an arrow R in FIG. 8 (in a counterclockwise direction).

As shown in FIG. 8, a plurality of engaging portions 23 may be arranged along an outer periphery of the wheel 22. A cylindrical shaft member (pin) may be used for each of the plurality of engaging portions 23. A left part of the wheel 22 may enter the driving passage 2*a* through a window 24*a* formed in the mechanism case 24. Each of the plurality of engaging portions 23 of the wheel 22 may engage a corresponding engaged portion 16 of the driver 15 in the driving passage 2*a*. The wheel 22 may rotate in a direction indicated by the arrow R while at least one of the engaging portions 23 engages an engaged portion 16 of the driver 15, thereby moving (returning) the driver 15 and the piston 13 in the upward direction.

As shown in FIGS. 1 and 6, a contact arm 3 may be arranged at a lower portion of the driving nose 2. The contact arm 3 may be slidable in the up-down direction. Furthermore, the contact arm 3 may be biased in a downward direction. A lower portion of the contact arm 3 may be below an ejecting port 2*b* when the contact arm 3 is not pressed against a workpiece W. When the contact arm 3 is pressed against the workpiece W, the contact arm 3 may move upward against the biasing force and the micro-switch 38 may enter an on-state.

Figure 11:
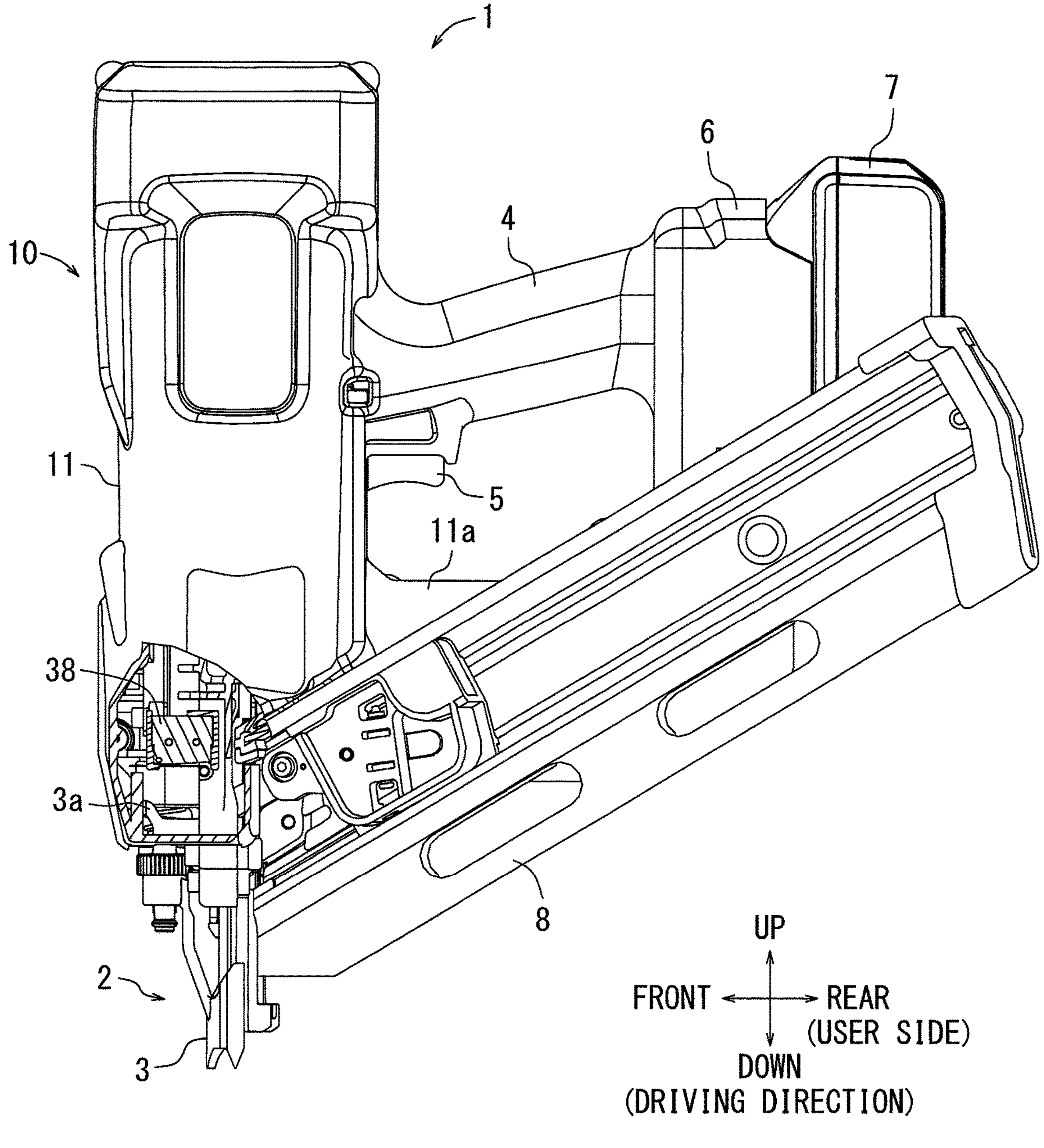
FIG. 11 is a left side view of the driving tool including a part of a cross-sectional cutout view taken along XI-XI of FIG. 3.

As shown in FIG. 11, an upper end 3*a* of the contact arm 3 may extend upward on a left front side of the driving nose 2. The micro-switch 38 may be disposed above the upper end 3*a* of the contact arm 3. When the contact arm 3 contacts the workpiece W (refer to FIG. 1) to cause it to move upward, the upper end 3*a* of the contact arm 3 may push the micro-switch 38, thereby causing the micro-switch 38 to enter the on-state. The controller 28 may detect a condition in which the contact arm 3 contacts the workpiece W in this manner.

When the micro-switch 38*b* shown in FIG. 11 is in an on-state, the controller 28 may receive an on-signal from the micro-switch 38*b*. Also, when the trigger 5 shown in FIG. 6 is pulled to cause the activation switch 5*a* to enter an on-state, the controller 28 may receive an on-signal from the activation switch 5*a*. When the controller 28 receives on-signals from both the micro-switch 38*b* and the activation switch 5*a*, the controller 28 may activate the electric motor 26 by supplying power from the battery pack 7. When a pull operation of the trigger 5 is stopped, the controller 28 may detect a condition in which the activation switch 5*a* enter an off-state. After the piston 13 and the driver 15 have returned to a standby state due to activation of the electric motor 26, the controller 28 may stop the power supply from the battery pack 7, thereby stopping the electric motor 26.

FIG. 8 shows an embodiment of a standby state of the piston 13 and the driver 15. When the piston 13 and the driver 15 are in the standby state, they may be held slightly below an upper end position and in a stopped state. When the motor 26 (refer to FIG. 6) is activated, the wheel 22 may rotate in a rotation direction indicated by an arrow R in FIG. 8, thereby moving the piston 13 and the driver 15 from a standby position toward the upper end position. When the driver 15 moves toward the upper end position, a driving member N (refer to FIG. 1) may be supplied from the magazine 8 to the driving passage 2*a*. When the driver 15 has reached the upper end position, the engaging portion 23 of the wheel 22 may disengage from the engaged portion 16 of the driver 15. Due to this, the piston 13 and the driver 15 may move downward due to a pressure of the gas in the accumulation chamber 14. The downward movement of the driver 15 within the driving passage 2*a* may drive the driving member N.

Even after the driver 15 has reached a lower end position to drive the driving member N into the workpiece W, the wheel 22 may continue to rotate. The engaging portion 23 of the rotating wheel 22 may engage the engaged portion 16 of the driver 15 again, thereby causing the piston 13 and the driver 15 to move toward the standby position. When the wheel 22 rotates such that the piston 13 and the driver 15 reach the standby position or near to the standby position, the electric motor 26 may be stopped using a control signal from the controller 28. Accordingly, rotation of the wheel 22 may stop and the piston 13 and the driver 15 may be held in the standby state. One sequence of the driving operation can be completed in this manner.

As shown in FIGS. 2 and 8, a lower portion of the cylinder 12 may be supportedly linked to the mechanism case 24. A vibration absorbing rubber piece 37 may be attached to each of the left and right sides of the mechanism case 24. As shown in FIG. 8, the vibration absorbing rubber piece 37 may be held between the main body housing 11 and the mechanism case 24 in the radial direction of the main body housing 11. Because of this configuration, the mechanism case 24 may be elastically held from both sides by the main body housing 11. As a result, an impact that the main body housing 11 receives from the outside, etc. may be prevented from being transmitted to interior components of the tool main body 10.

As shown in FIG. 8, the accumulation chamber 14 may include an upper chamber 32 and an air chamber 30. The upper chamber 32 may be arranged above the cylinder 12. The air chamber 30 may be arranged on the right side of the cylinder 12. The air chamber 30 may be formed inside a chamber case 31 that is disposed along an outer periphery of the cylinder 12. The upper chamber 32 may be formed inside a top cap 33 that is connected to an upper end surface of the chamber case 31. The top cap 33 may cover a top portion of the cylinder 12 as well as a top portion of the chamber case 31. The top cap 33 and the chamber case 31 may be formed so as to not protrude beyond a front portion of the tool main body 1 in the front-rear direction where the lift mechanism 20, the contact arm 3, and/or any other component are arranged.

As shown in FIG. 2, a cylindrical front boss portion 31*a* may be formed in a front outer periphery of the chamber case 31. A cylindrical rear boss portion 31*b* may be formed in a rear outer periphery of the chamber case 31. An insertion hole passing through in an up-down direction may be formed in each of the front boss portion 31*a* and the rear boss portion 31*b*. A cylindrical front boss portion 33*a* may be formed in a front outer periphery of the top cap 33. A cylindrical rear boss portion 33*b* may be formed in a rear outer periphery of the top cap 33. A screw hole extending in the up-down direction may be formed in each of the front boss portion 33*a* and the rear boss portion 33*b*. The insertion hole of the front boss portion 31*a* and the screw hole of the front boss portion 33*a* may be arranged in the up-down direction. Also, the insertion hole of the rear boss portion 31*b* and the screw hole of the rear boss portion 33*b* may be arranged in the up-down direction. The top cap 33 may be joined to the chamber case 31 in the up-down direction through screw connection by inserting a male screw into the corresponding insertion hole and the screw hole.

As shown in FIGS. 7 and 8, an upper end surface 31*c* of the chamber case 31 may face a lower end surface 33*c* of the top cap 33 in the up-down direction. A seal member 35 may be held between the upper end surface 31*c* of the chamber case 31 and the lower end surface 33*c* of the top cap 33. The seal member 35 may be, for example, an O-ring having a larger diameter than that of the cylinder 12. The upper end surface 31*c* of the chamber case 31 may include a groove for housing the sealing member 35. The chamber case 31 may be brought into face to face contact with the top cap 33 in the up-down direction, with the seal member 35 airtightly sealing the chamber case 31 and the top cap 33.

As shown in FIGS. 7 and 8, a surface 31*e* of the chamber case 31 on an inner peripheral side in its radial direction may face an outer peripheral surface of the cylinder 12 in a radial direction of the cylinder 12. As clearly shown in FIG. 7, two seal members 36 may be held between the surface 31*e* of the chamber case 31 and the outer peripheral surface of the cylinder 12. The seal members 36 may be, for example, O-rings each having approximately the same diameter as that of an upper portion of the cylinder 12. The two O-rings of the seal members 36 may be arranged in parallel in the up-down direction. The outer peripheral surface of the cylinder 12 may include two annular grooves for housing the seal members 36. The chamber 31 may be brought into face to face contact with the cylinder 12 in the radial direction of the cylinder 12, with the seal members 36 airtightly sealing the chamber case 31 and the cylinder 12. Accordingly, the chamber case 31 may cooperate with the top cap 33 to airtightly form the accumulation chamber 14 with the help of the seal members 35, 36.

As shown in FIGS. 7 and 8, an upper inner peripheral surface of the main body housing 11 may include support ribs 11*b*, each extending inward in the radial direction of the main body housing 11. Each of the support ribs 11*b* may be annularly formed on the inner peripheral surface of the main body housing 11. In the present disclosure, two support ribs 11*b* may be formed in parallel in the up-down direction. An inner peripheral end surface of each support rib 11*b* may face and contact a surface 31*d* of the chamber case 31 on a radially outer peripheral side of the chamber case 31. The chamber case 31 may be held between the support ribs 11*b* of the main body housing 11 and the outer peripheral surface of the cylinder 12 in the radial direction of the cylinder 12.

As shown in FIG. 8, the chamber case 31 may extend in the up-down direction along an outer peripheral surface of the cylinder 12. An upper end of the chamber case 31 may be positioned slightly above the standby position of the piston 13. A lower end of the chamber case 31 may be positioned approximately at the trigger 5. The vibration absorbing rubber piece 37 supporting the mechanism case 24 may be positioned below a lower end of the chamber case 31. The lift mechanism 20 may be positioned below the vibration absorbing rubber piece 37. A right side surface of the main body housing 11 that houses the chamber case 31 may be configured to not exceed beyond a right side end of the driving unit 11*a* that houses the lift mechanism 20 in a rightward direction (refer to FIG. 5).

As shown in FIG. 10, the chamber case 31 may be formed in a crescent shape in a cross sectional view perpendicular to the up-down direction. A radial inner peripheral surface of the chamber case 31 may be disposed along an outer peripheral surface of the cylinder 12. A radial outer peripheral surface of the chamber case 31 may be disposed along an inner peripheral surface of the main body housing 11. As shown in FIGS. 8 and 10, a left end of the chamber case 31 may be positioned on a right side of a center axis 12*a* of the cylinder 12 and also on a right side of a center axis 4*a* of the grip 4 in the left-right direction. A left end of the chamber case 31 may be positioned on a right side of the trigger 5. Because of this configuration, the air chamber 30 may not be disposed in an area between the cylinder 12 and the trigger 5 in the front-rear direction.

Referring to FIG. 10, a front area 30*a* of the air chamber 30 may be an area on a front side of a front end position L1. As shown in FIG. 10, the front end position L1 may be positioned at the same position as a front end of the cylinder 12 in the front-rear direction. Similarly, a rear area 30*e* of the air chamber 30 may be an area on a rear side of a rear end position L2. The rear end position L2 may be positioned at the same position as a rear end of the cylinder 12 in the front-rear direction. Furthermore, a lateral area 30*c* of the air chamber 30 may be an area positioned between the front end position L1 and the rear end position L2. The front area 30*a* may be formed to have approximately the same front-rear width 30*b* over the left-right direction. Similarly, the rear area 30*e* may be formed to have approximately the same front-rear width 30*f* over the left-right direction. Furthermore, the lateral area 30*c* may be formed to have the same left-right width 30*d* over the front-rear direction.

As shown in FIG. 10, the left-right width 30*d* in the lateral area 30*c* may be configured to be larger than both the front-rear width 30*b* of the front area 30*a* and the front-rear width 30*f* of the rear area 30*e*. Furthermore, the front-rear width 30*f* of the rear area 30*e* may be configured to be smaller than the front-rear width 30*b* of the front area 30*a*. For example, the left-right width 30*d* may be configured to be roughly one and a half times the length of the front-rear width 30*b* of the front area 30*a* and two times the length of the front-rear width 30*f* of the rear area 30*e*.

Figure 9:
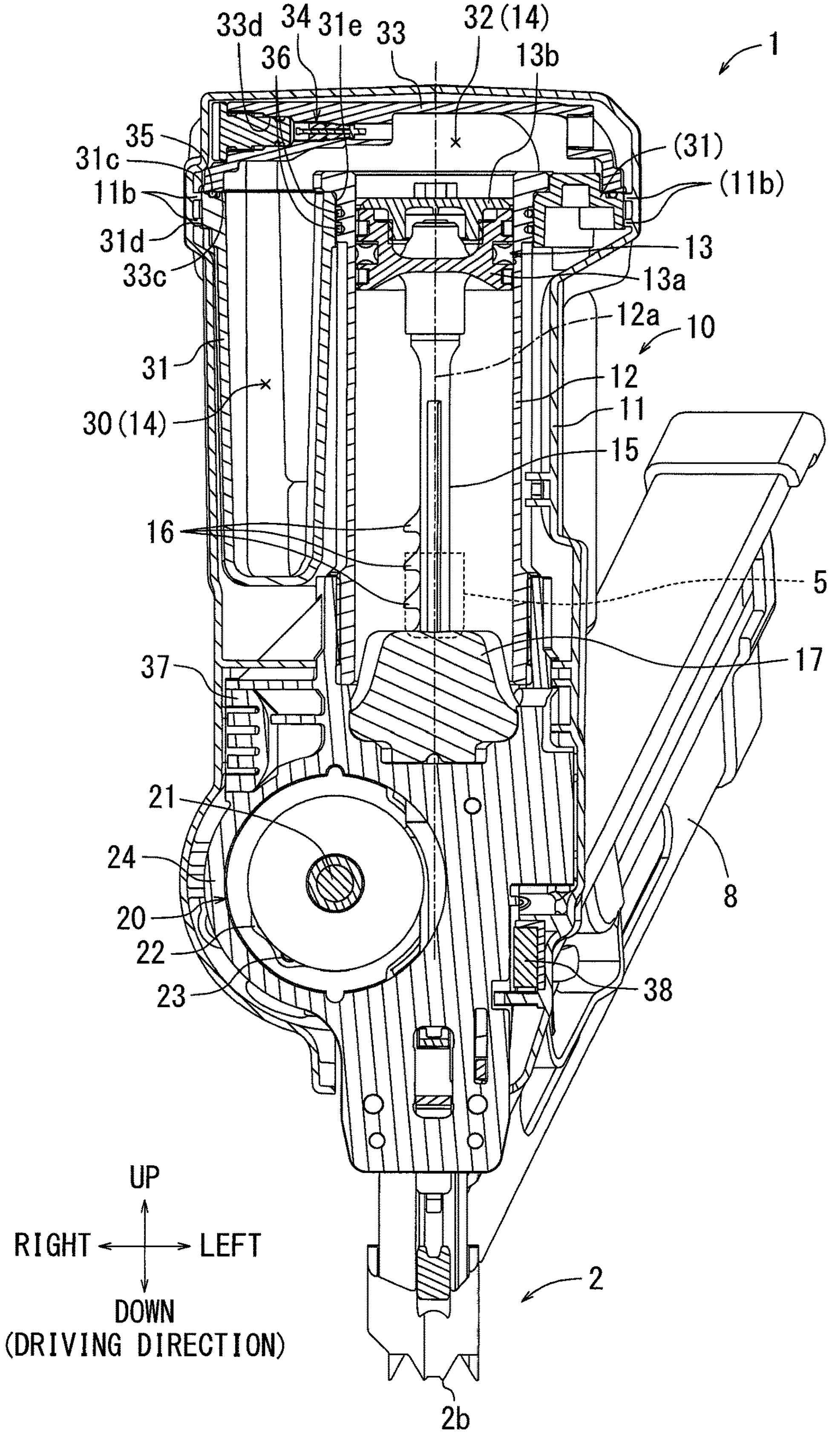
FIG. 9 is a cross-sectional view taken along line IX-IX of FIG. 1.

As shown in FIG. 9, a valve receiving portion 33*d* formed in a through-hole shape extending in the left-right direction may be provided in an upper right side portion of the top cap 33. A filling valve 34, through which a compressed gas is supplied to the upper chamber 32 and the air chamber 30, may be housed in the valve receiving portion 33*d*. A right end of the filling valve 34 may serve as a supply port for supplying a compressed gas from the outside. The right end of the filling valve 34 may be positioned to approximately align with a right end surface of the chamber case 31 in the left-right direction. A left end of the filling valve 34 may serve as a discharge port for discharging a compressed air to within the upper chamber 32. The left end of the filling valve 34 may be positioned slightly on a left side of a right end of the cylinder 12.

As discussed above, the driving tool 1 may include a cylinder 12 extending in the up-down direction, as shown in FIGS. 8 and 10, and also include the piston 13 that moves downward due to compressed gas in the cylinder 12 to drive a driving member N. The driving tool 1 may include a main body housing 11 that houses the cylinder 12 and a grip 4 that extends rearward from a rear surface of the main body housing 11. The driving tool 1 may include an upper chamber 32 that is disposed above the cylinder 12 and that communicate with the cylinder 12. Furthermore, the driving tool 1 may include an air chamber 30 that extends downward from the upper chamber 32. The air chamber 30 may extend only in a right side area of the main body housing 11 with respect to both an center axis 12*a* of the cylinder 12 and a center axis 4*a* of the grip 4 in the left-right direction.

Since the air chamber 30 extends downward from the upper chamber 32, an upper area of the driving tool 1 may be restricted from being enlarged. Furthermore, since the air chamber 30 is arranged on a right side with respect to both the center axis 12*a* of the cylinder 12 and the center axis 4*a* of the grip, a distance between the center axis 12*a* of the cylinder 12 and a front end of the grip 4 in the front-rear direction may be made small. When a user operates the driving tool 1, the user may hold a vicinity of a front end of the grip 4 to hold the driving tool 1. Because of this, when a driving member N is driven, the driving tool 1 may receive a reaction force from the workpiece W. Due to the reaction force, a rotational moment that rotates the driving tool 1 around the vicinity of the front end of the grip 4 may be generated. However, the arrangement of the air chamber 30 discussed above can reduce this rotational moment. Furthermore, the arrangement of the air chamber 30 discussed above can also restrict the size of the front area of the driving tool 1. Because of this configuration, the air chamber 30 may be structured to be compact around the cylinder 12. Furthermore, the rotational moment in the driving tool 1 that occurs when a driving operation is performed can be reduced, thereby improving operability of continuous operation (e.g., sequential driving operations) of the driving tool 1.

As shown in FIG. 10, the air chamber 30 may continuously include a front area 30*a* positioned on the front side of the cylinder 12, a lateral area 30*c* positioned on the right side of the cylinder 12, and a rear area 30*e* positioned on the rear side of the cylinder 12. The left-right width 30*d* of the lateral area 20*a* may be larger than both the front-rear width 30*b* of the front area 30*a* and the front-rear width 30*f* of the rear area 30*e*. Because of this configuration, a protruding quantity of the main body housing 11 that houses the cylinder 12 and the air chamber 30 may be prevented from protruding too far in the front-rear direction. As a result, a rotation movement of the driving tool 1 in the front-rear direction due to the reaction force generated when a driving operation is performed may be reduced.

As shown in FIG. 10, the front-rear width 30*f* of the rear area 30*e* may be smaller than the front-rear width 30*b* of the front area 30*a*. Accordingly, a distance between the center axis 12*a* of the cylinder 12 and a front end of the grip 4 can be made small. Because of this configuration, a rotation movement of the driving tool 1 around the front end of the grip 4 due to a reaction force generated when a driving operation is performed may be effectively reduced.

As shown in FIG. 8, the driving tool 1 may include a driver 15 that is provided below the piston 13 and that drives a driving member N. The driving tool may also include a magazine 8 for supplying driving members N to the driving passage 2*a*. The magazine 8 may be linked to the main body housing 11 on a left side of the main body housing 11, the left side being a side that is opposite to the air chamber 31, which is disposed on a right side of the main body housing 11 in this embodiment. By arranging the air chamber 30 and the magazine 8 on opposite sides to each other, the driving tool 1 may have a good weight balance in the left-right direction. As a result, usability of the driving tool 1 can be improved.

As shown in FIG. 8, the driving tool 1 may have a lift mechanism 30 that moves the driver 15, which drives a driving member N in the driving direction, in a direction opposite to the driving direction. The lift mechanism 20 may be provided on a right side of the main body housing 11, which is on the same side as the air chamber 30. In order to make the driving tool 1 compact in the up-down direction, it may be needed to arrange the lift mechanism 20 on either the left side or right side so as to not protrude the lift mechanism 20 in the up-down direction. In particular, by arranging the lift mechanism 20 and the air chamber 30 on the same side, the main body housing 11 may be made compact in the left-right direction.

As shown in FIG. 10, the air chamber 30 may be arranged and/or structured so as to not be intersected by a front-rear plane that includes both the center axis 12*a* of the cylinder 12 and the center axis 4*a* of the grip 4. Because of this configuration, a front-rear width of the main body housing 11 that houses the cylinder 12 and the air chamber 30 may be made compact.

As shown in FIGS. 2 and 10, the trigger 5 for operating the driving tool 1 may be provided at a front end of the grip 4 adjacent to the main body housing 11. The air chamber 30 may be provided so as to not be positioned between the trigger 5 and the cylinder 12. Accordingly, a distance between the center axis 12*a* of the cylinder 12 and the trigger 5 may be reduced. The driving tool 1 may be held by a user in the vicinity of the trigger 5.

Accordingly, a rotation movement of the driving tool 1 around the trigger 5 due to a reaction force generated when a driving operation is performed may be reduced.

As shown in FIG. 9, the driving tool 1 may include a top cap 33 that is provided at an upper portion of the main body housing 11 and that defines the upper chamber 32. The driving tool 1 may include the filling valve 34 through which a compressed gas can be supplied to the upper chamber 32. The filling valve 34 may be arranged on the right surface side of the top cap 33, which is the same side on which the air chamber 30 is disposed. Accordingly, the top cap 33 may be formed extending in the right direction in the same manner as the air chamber 30 that extends in the right direction. In other words, the filling valve 34 may be arranged by utilizing a space in which the top cap 33 is arranged to extend in the right direction. Because of this configuration, the main body housing 11 that houses the top cap 33 and the air chamber 30 may be made compact in the left-right direction. Furthermore, by arranging the filling valve 34 on the right surface side of the top cap 33, the top cap 33 may be arranged so as to make the top cap 33 compact in the front-rear direction.

The embodiment discussed above may be modified in various ways. For example, the arrangement of the air chamber 30, the magazine 8, the lift mechanism 20, the filling valve 34, etc. may not be limited to the above exemplified arrangement. For example, the air chamber 30 may be arranged on the left side of the cylinder 12. For example, the magazine 8 may be arranged on the right side of the tool main body 10. For example, the lift mechanism 20 may be arranged on the left side of the driving nose 2. For example, the filling valve 34 may be arranged on the left surface side of the top cap 33.

In the above-identified embodiment, the driving tool 1 may be exemplified such that a line perpendicular to the center axis 12*a* of the cylinder 12 is coincident with the center axis 4*a* of the grip 4. Instead, the line perpendicular to the center axis 12*a* of the cylinder 12 may not be coincident with the center axis 4*a* of the grip 4. In other words, the line perpendicular to the center axis 12*a* of the cylinder 12 may be offset with regard to the axis center 4*a* of the grip 4.

In the above-identified embodiment, the activation switch 5*a* may be arranged such that the activation switch 5*a* is housed in the grip 4 and is above the trigger 5. Instead, the activation switch 5*a* may be housed in the battery attachment portion 6 that is disposed on the rear side of the grip 4. Furthermore, the activation switch 5*a* may be arranged between the lift mechanism 20 and a lower end of the chamber case 31.

Furthermore, with regard to the air chamber 30, the front-rear width 30*b* in the front area 30*a*, the left-right width 30*d* in the lateral area 30*c*, and the front-rear width 30*f* in the rear area 30*e* may not be limited to the exemplified configuration discussed above. For example, the front-rear width 30*f* in the rear area 30*e* may be made so small that a capacity of the rear area 30*e* is extremely small.

What is claimed is:

1. A driving tool, comprising:
- a cylinder having a cylinder longitudinal center axis extending in an up-down direction;
- a piston that is configured to move downward within the cylinder due to a compressed gas to drive a driving member;
- a housing that houses the cylinder;
- a grip (i) having a grip longitudinal center axis and (ii) extending rearward from a rear surface of the housing in a front-rear direction;
- an upper air chamber that is above the cylinder and communicates with the cylinder; and
- a lower air chamber that extends downward in the up-down direction from the upper air chamber and wraps partially around the cylinder from a front portion of the cylinder to a rear portion of the cylinder in the front-rear direction, wherein:
- the upper air chamber and the lower air chamber are in the housing;
- the housing is divided into a left portion and a right portion by a plane including the grip longitudinal center axis and the cylinder longitudinal center axis; and
- the lower air chamber is configured such that the lower air chamber is not intersected by the plane.

2. The driving tool according to claim 1, wherein
- the lower air chamber includes:
  - a front area on a front side of the cylinder;
  - a lateral area on either a left side or a right side of the cylinder; and
  - a rear area on a rear side of the cylinder, and
- a left-right width of the lateral area on a line perpendicular to the plane and passing through the cylinder longitudinal center axis is larger than both a front-rear width of the front area and a front-rear width of the rear area on a line parallel to the plane.

3. The driving tool according to claim 2, wherein
- the front-rear width of the rear area is smaller than the front-rear width of the front area.

4. The driving tool according to claim 1, further comprising:
- a driver that is (i) below the piston and (ii) configured to drive the driving member in a driving direction; and
- a magazine configured to supply the driving member to a driving passage through which the driver passes, wherein
- the magazine is linked to the housing such that the magazine is on a side opposite to the lower air chamber with respect to the plane.

5. The driving tool according to claim 1, further comprising:
- a driver that is configured to drive the driving member in a driving direction; and
- a lift mechanism that is configured to move the driver in a direction opposite to the driving direction,
- wherein a majority of the lift mechanism is on a same side as the lower air chamber with respect to the plane.

6. The driving tool according to claim 1, further comprising:
- a trigger that is (i) at a front end of the grip and (ii) configured to be operated to activate the driving tool, the front end of the grip being adjacent to the housing, wherein
- the trigger is intersected by the plane such that the lower air chamber is not directly between the trigger and the cylinder.

7. The driving tool according to claim 1, further comprising:
- a top cap that (i) is at an upper portion of the housing and (ii) defines the upper air chamber; and
- a filling valve configured to supply compressed gas to the upper air chamber,
- wherein
- the filling valve passes through a lateral surface of the top cap, the lateral surface being on a same side as the lower air chamber with respect to the plane.

8. The driving tool according to claim 1, wherein the upper air chamber extends farther in either a left direction or a right direction in the left-right direction with respect to the plane.

9. A driving tool, comprising:
- a cylinder having a cylinder longitudinal center axis extending in an up-down direction;
- a piston that is configured to move downward within the cylinder due to a compressed gas to drive a driving member;
- a housing that houses the cylinder;
- a grip (i) having a grip longitudinal center axis, (ii) extending from the housing in a front-rear direction, and (iii) including a trigger;
- an upper air chamber that is above the cylinder and communicates with the cylinder; and
- a lower air chamber that extends downward from the upper air chamber and wraps partially around the cylinder from a front portion of the cylinder to a rear portion of the cylinder, wherein:
- the upper air chamber and the lower air chamber are in the housing; and
- a plane extending in the up-down direction passing through the trigger and including the cylinder longitudinal center axis does not intersect the lower air chamber.

10. The driving tool according to claim 9, further comprising:
- a lift mechanism configured to move the piston upward, wherein
- a line parallel to the plane intersects both the lower air chamber and the lift mechanism.

11. The driving tool according to claim 9, further comprising:
- a magazine configured to supply the driving member to a position where it can be driven, wherein
- a line parallel to the plane does not intersect both the lower air chamber and the magazine.

12. A driving tool, comprising:
- a cylinder having a cylinder longitudinal axis extending in an up-down direction;
- a piston that is configured to move downward within the cylinder due to a compressed gas to drive a driving member;
- a housing that houses the cylinder;

a grip extending rearward from a rear surface of the housing in a front-rear direction;

an upper air chamber that is above the cylinder and communicates with the cylinder; and a lower air chamber that communicates with and extends downward from the upper air chamber and wraps partially around the cylinder from a front portion of the cylinder to a rear portion of the cylinder, wherein:

the upper air chamber and the lower air chamber are in the housing;

a majority of the lower air chamber extends beyond one side of the grip in a direction perpendicular to the longitudinal axis of the cylinder; and a plane in the up-down direction passing through both the grip and the cylinder does not intersect the lower air chamber.

13. The driving tool according to claim 12, wherein a line extending through both the grip and the cylinder does not intersect the lower air chamber.

14. The driving tool according to claim 13, wherein the majority of the lower air chamber extends beyond the one side of the grip in a direction perpendicular to the line.

15. The driving tool according to claim 14, wherein the lower air chamber extends downward beyond the line.

16. The driving tool according to claim 12, wherein:

the grip further comprises a trigger, a line passing through the trigger and the longitudinal axis of the cylinder does not intersect the lower air chamber, and the majority of the lower air chamber extends beyond the one side of the grip in a direction perpendicular to the line passing through the trigger and the longitudinal axis of the cylinder.

* * * * *